US006658747B2

(12) United States Patent
Kuru

(10) Patent No.: US 6,658,747 B2
(45) Date of Patent: Dec. 9, 2003

(54) POSITION SENSOR FOR A HYDRAULIC ACTUATOR AND HYDRAULIC SYSTEM USING THE SAME

(75) Inventor: Shinji Kuru, Mie (JP)

(73) Assignee: Yasunaga Corporation, Ueno (JP)

( * ) Notice: Subject to any disclaimer, the term of this patent is extended or adjusted under 35 U.S.C. 154(b) by 25 days.

(21) Appl. No.: 10/114,583

(22) Filed: Apr. 2, 2002

(65) Prior Publication Data

US 2002/0178593 A1 Dec. 5, 2002

(30) Foreign Application Priority Data

May 31, 2001 (JP) ....................................... 2001-164936

(51) Int. Cl.[7] .............................. G01B 7/00; G01F 3/04

(52) U.S. Cl. ..................... 33/1 PT; 33/708; 33/DIG. 1; 33/DIG. 15; 73/261

(58) Field of Search ........................... 33/1 PT, DIG. 1, 33/DIG. 15, 1 N, 706, 708, DIG. 2; 73/261

(56) References Cited

U.S. PATENT DOCUMENTS 4,409,829 A * 10/1983 Weber ......................... 73/261
4,579,008 A * 4/1986 Bohm et al. .................. 73/261
4,815,318 A * 3/1989 LoPresti ...................... 73/261
5,184,519 A * 2/1993 Ciarelli et al. ................ 73/261
5,553,493 A * 9/1996 Box et al. ..................... 73/261
5,704,767 A * 1/1998 Johnson ....................... 73/261
5,895,847 A * 4/1999 Steuer ......................... 73/261
5,930,905 A * 8/1999 Zabler et al. ............... 33/1 PT
5,992,230 A * 11/1999 Scarpa et al. ............... 73/261
6,507,188 B1 * 1/2003 Dilger et al. ............... 33/1 PT

* cited by examiner

*Primary Examiner*—Christopher W. Fulton
*Assistant Examiner*—Madeline Gonzalez
(74) *Attorney, Agent, or Firm*—Frishauf, Hotlz, Goodman & Chick, P.C.

(57) ABSTRACT

A hydraulic system includes position sensors that are provided together with solenoid valves in fluid passages extending between a working fluid source and hydraulic actuators. Each position sensor is comprised of two gears disposed in the fluid passage so as to be rotatable by the flow of working fluid, and two sensing elements each disposed to face either one of the gears. A controller determines the operating position of each actuator based on sensor outputs that are out of phase with each other and are generated by the sensing elements each time the gears rotate for a predetermined angle.

15 Claims, 4 Drawing Sheets

POSITION SENSOR FOR A HYDRAULIC ACTUATOR AND HYDRAULIC SYSTEM USING THE SAME

BACKGROUND OF THE INVENTION

1. Technical Field

The present invention relates to a position sensor for a hydraulic actuator, and more particularly, to a position sensor capable of contactlessly detecting one or more operating positions of a hydraulic actuator utilizing the flow of working fluid and a hydraulic system using such a position sensor.

2. Related Art

A hydraulic system such as a machine tool is generally provided with hydraulic actuators that are operated under the control of a controller, so as to actuate various operating sections of the hydraulic system to thereby carry out desired operations. To this end, operating positions of the hydraulic actuators are detected by position sensors and supplied to the controller.

To detect the operating position of a hydraulic actuator, a limit switch serving as a position sensor is widely used. On the other hand, as a hydraulic actuator, a cylinder actuator is employed that has a cylinder body, a piston disposed to be movable therein, and a rod formed integrally with the piston and that is configured to move the rod back and forth by supplying and discharging working fluid to and from a cylinder chamber defined by the cylinder body and the piston.

The limit switch is provided with an operative element, i.e., a switch, disposed in the vicinity of a predetermined moving position of the rod. The operative element is actuated when a dog formed in the rod is brought in contact with the operative element during the rod movement, thereby detecting the operating position of the actuator.

In the case of position detection using limit switches, a hydraulic system requires a large number of limit switches each arranged to detect a corresponding one of objective operating positions of an associated cylinder actuator. This may cause difficulties in arranging some of the limit switches at their desired locations in narrow spaces around cylinder actuators associated therewith and in performing maintenance of these limit switches. Furthermore, a number of wires are required to connect the limit switches and the controller. Depending on circumstances in which limit switches are disposed, operative elements are sometimes exposed to the outside. This permits dusts and fluid drops to adhere to the operative elements, resulting in occurrences of operating failures and erroneous operations.

SUMMARY OF THE INVENTION

An object of the present invention is to provide a position sensor capable of contactlessly detecting one or more operating positions of a hydraulic actuator utilizing a flow of working fluid, without using a contact-type position sensor such as a limit switch.

Another object of the present invention is to provide a hydraulic system provided with the aforesaid non-contact type position sensor.

A position sensor according to the present invention comprises: at least one gear disposed in a fluid passage of a hydraulic actuator so as to be rotatable by a flow of working fluid in the fluid passage; a first sensing element, disposed to face the gear, for generating a first sensor output each time the gear rotates for a predetermined angle; a second sensing element, disposed to face the gear, for generating a second sensor output which is out of phase with the first sensor output each time the gear rotates for the predetermined angle; and a detecting section for determining an operating position of the hydraulic actuator based on the first and second sensor outputs supplied from the first and second sensing elements.

In the present invention, the gear of the position sensor rotates when working fluid flows in a fluid passage of a hydraulic actuator, and first and second sensor outputs that are out of phase with each other are supplied from the first and second sensing elements to the detecting section each time the gear rotates for a predetermined angle. From a phase relation between the first and second sensor outputs, the detecting section determines the direction of rotation of the gear indicative of the direction of the working fluid flow and, by extension, the direction of operation of the hydraulic actuator. Further, the detecting section can determine an amount of rotation of the gear indicative of an amount of operation of the hydraulic actuator based on the number of times for which the first or second sensor output is generated. Thus, an operating position of the hydraulic actuator can be determined based on the first and second sensor outputs.

As mentioned above, the position sensor of the present invention, having a sensing section comprised of a gear disposed in a fluid passage and two sensing elements disposed to face the gear, is capable of contactlessly detecting an operating position of a hydraulic actuator without using a contact-type sensing element such as a limit switch. In addition, the sensing section of the position sensor is not required to be disposed near the hydraulic actuator. Thus, it is easy to prevent dusts and fluid drops from adhering to the sensing section, thereby eliminating operating failures and erroneous operations of the sensing section. Also, a wire may be shortened in length that connects the sensing section with a detecting section of the position sensor. Furthermore, unlike a conventional position sensor having sensing sections such as limit switches that are provided for individual operating positions being detected, the position sensor of this invention can detect one or more operating positions of a hydraulic actuator by means of a single sensing section comprised of a gear and sensing elements. In other words, the sensing section of the position sensor of this invention serves as one or more limit switches. For this reason, it is enough to provide each position sensor with a single sensing section, even if two or more operating positions should be detected for each actuator. Accordingly, installation and maintenance of position sensors in a hydraulic system can be carried out with ease. The required number of wires connecting the sensing section of a position sensor with a detecting section thereof can be also reduced, and a frequency of occurrences of wire disconnection may be reduced.

In the present invention, preferably, each of the first and second sensing elements is comprised of a magnetic proximity sensing element disposed to face a peripheral portion of the gear, and the at least one gear is made of a metal material capable of influencing a magnetic field.

With this preferred arrangement, each sensing element supplies the sensor output to the detecting section each time a tooth portion of the gear passes in front of the sensing element, whereby the operating position of a hydraulic actuator can be contactlessly detected with reliability.

Preferably, the position sensor comprises first and second gears that are disposed in the fluid passage so as to be in mesh with each other and to be rotatable by a flow of the working fluid. More preferably, the first and second gears are disposed in the fluid passage so as to receive the flow of the working fluid at their portions where they are in mesh with each other.

According to this preferred arrangement, the flow of the working fluid acting on the first and second gears is converted into gear rotation with efficiency and accuracy, so that the first and second gears rotate in a manner appropriately following the flow of the working fluid, thereby improving the accuracy of detecting the operating position of the hydraulic actuator.

Preferably, the position sensor further comprises a sensor block that includes a sensor block body formed with first and second fluid passage portions constituting part of the fluid passage and having a first outer face to which respective one ends of the first and second fluid passage portions open, and a first plate attached to the first outer face of the sensor block body. The first plate is formed with a gear-accommodating space for receiving the at least one gear so as to be rotatable, the gear-accommodating space being communicated with the respective one ends of the first and second fluid passage portions.

With this preferred arrangement, the gear can be easily disposed in the fluid passage so as to be rotatable by a flow of working fluid by simply attaching the first plate that accommodates the gear to the sensor block body.

More preferably, the gear-accommodating space is formed so as to receive first and second gears to be in mesh with each other and to be rotatable by the flow of the working fluid. More preferably, the gear-accommodating space is formed so as to be communicated with respective one ends of the first and second fluid passage portions in vicinity of portions of the first and second gears where they are in mesh with each other.

According to these preferred arrangements, the flow of the working fluid is permitted to properly act on the gears.

Preferably, the position sensor further comprises a second plate attached to an outer face of the first plate on a side remote from the sensor block. The second plate is formed with an element-attaching section to which the first and second sensing elements are attached so as to face the gear.

With this preferred arrangement, the first and second sensing elements can be accurately disposed to face the gear by simply attaching the second plate, mounted with the sensing elements, to the first plate, whereby the position sensor can be simplified in construction and the detecting accuracy of the sensing elements can be improved.

A hydraulic system according to the present invention comprises: a working fluid source for supplying working fluid; one or more hydraulic actuators that are operable in response to supply of the working fluid; one or more fluid passages extending between the working fluid source and the one or more hydraulic actuators; one or more valves disposed in the one or more fluid passages for allowing or prohibiting the supply of the working fluid from the working fluid source to the one or more hydraulic actuators through the one or more hydraulic passages; a controller for drivingly controlling the one or more valves; and one or more position sensors disposed in the one or more fluid passages, each of the one or more position sensors being configured as mentioned in the above.

In the hydraulic system of the present invention, each of the one or more valves is drivingly controlled by the controller, to supply working fluid from the working fluid source through the associated fluid passage to a corresponding hydraulic actuator, thereby operating the same. At this time, the operating position of the hydraulic actuator is detected by the position sensor and is provided for control of the hydraulic actuator by means of the controller. The position sensor is configured as mentioned above, so that the aforementioned advantages can be attained such that the operating position of the hydraulic actuator can be contactlessly detected, to permit the controller to properly control the drive of one or more hydraulic actuators.

In the hydraulic system of the present invention, preferably, each of the one or more position sensors is disposed in the fluid passage between the valve and the hydraulic actuator, which individually correspond to the position sensor.

According to this preferred arrangement, the position sensor is disposed in a fluid passage region in which a flow of the working fluid is produced which adequately corresponds to the flow of the working fluid actually affecting on the operation of the hydraulic actuator, thus permitting the position sensor to accurately detect the operating position of the hydraulic actuator.

Preferably, each of the one or more valves is comprised of an electromagnetic changeover valve.

For instance, each electromagnetic changeover valve has first and second input ports and first and second output ports. The first and second input ports are connected to the working fluid source and a reservoir section for storing the working fluid therein. The first and second output ports are connected to first and second ports of a hydraulic actuator corresponding to the electromagnetic changeover valve, respectively. Under the control of the controller, the electromagnetic changeover valve assumes a first changeover position where the first and second input ports are individually communicated with the first and second output ports and a second changeover position where the first input port is communicated with the second output port and the second input port is communicated with the first output port. Alternatively, the electromagnetic changeover valve assumes the first or second changeover position or a neutral position where communication between the first and second input ports and the first and second output ports is prohibited.

With the aforesaid preferred arrangement using an electromagnetic changeover valve, the valve can be drivingly controlled by the controller with ease, with accuracy and with improved response.

More preferably, the hydraulic system has one or more position sensors each of which is configured as mentioned above. That is, each position sensor comprises a sensor block including a sensor block body formed with first and second fluid passage portions and having first outer face thereof to which respective one ends of the first and second fluid passage portions open, and each sensor block body has a second outer face thereof to which another end of the second fluid passage portion opens. The hydraulic system further comprises one or more valve blocks each attached to the second outer face of the sensor block body of a corresponding one of the one or more position sensors. Each valve block has a valve-attaching portion thereof to which a corresponding one valve is attached. The valve block is formed with a first fluid passage portion in alignment with another end of the second fluid passage portion formed in the sensor block body associated therewith.

More preferably, each sensor block body has a third outer face to which another end of the first fluid passage portion formed therein opens. Each sensor block body is further formed with third, fourth and fifth fluid passage portions having their opposite ends that open to the second and third outer faces of the sensor block body, respectively. Each valve block is formed with second, third and fourth fluid passage portions in alignment with respective one ends of the third, fourth and fifth fluid passage portions formed in the sensor block body associated therewith.

With the preferred arrangements, corresponding ones of the fluid passage portions formed in the valve block and the sensor block body can be communicated with one another by simply attaching the valve body, mounted with the valve, to the sensor block body. This facilitates the assembly of the hydraulic system and permits a simplified construction thereof.

More preferably, the hydraulic system further comprises one or more manifold blocks each attached to the third outer face of the sensor block body of a corresponding one of the one or more position sensors. Each manifold block is formed with first through fourth fluid passage portions in alignment with respective other ends of the first, third, fourth and fifth fluid passage portions formed in the sensor block body associated therewith.

This preferred arrangement makes it possible to simplify the fabrication and construction of the hydraulic system

DETAILED DESCRIPTION

With reference to FIGS. 1–5, a hydraulic system according to an embodiment of the present invention will be explained.

Figure 1:
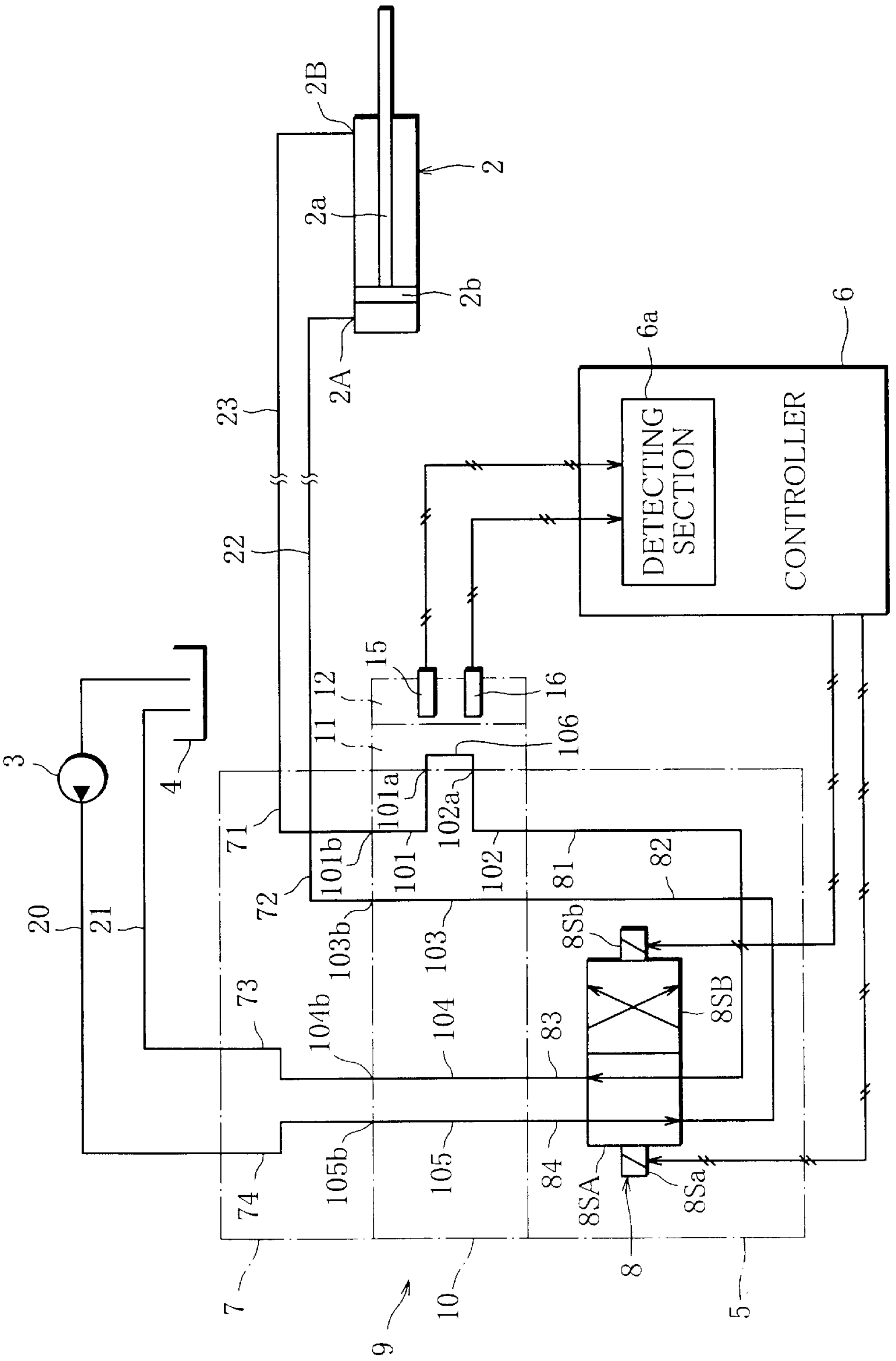
FIG. 1 is a schematic view of a hydraulic system according to one embodiment of the present invention.

As shown in FIG. 1, the hydraulic system of this embodiment is configured to control the supply and discharge of working fluid to and from a plurality of hydraulic actuators such as hydraulic cylinder actuators (one of which is shown by reference numeral 2 in FIG. 1) by means of electromagnetic changeover valves (hereinafter referred to as solenoid valves) 8 that operate under the control of a controller 6, thereby drivingly controlling the actuators 2 to carry out the desired operation such as moving a workpiece (not shown) to a predetermined position.

Each solenoid valve 8, which is a four-port, two-position type, has first and second input ports and first and second output ports. The first and second input ports are connected through an oil passage to the discharge side of an oil pump 3 and an oil tank 4, respectively. The first and second output ports are connected through the oil passage to first and second ports 2A, 2B of the cylinder actuator, respectively.

When a first solenoid coil 8Sa of each solenoid valve 8 is supplied with electric power from the controller 6, the solenoid valve 8 assumes a first changeover position 8SA in which the first and second input ports are in communication with the first and second output ports, respectively. In this case, the working oil is supplied from the pump 3 through the oil passage to the first port 2A of the cylinder actuator 2 and enters into a first cylinder chamber of the cylinder actuator 2, thereby causing a rod 2*a* of the actuator 2 to advance, while permitting a piston 2*b* of the actuator 2 to discharge the working oil from a second cylinder chamber through the second port 2B. On the other hand, when a second solenoid coil 8Sb of the solenoid valve 8 is energized, the solenoid valve 8 assumes a second changeover position 8SB where the first input port is communicated with the second output port and the second input port is communicated with the first output port, so that the working oil is supplied to the second cylinder chamber of the cylinder actuator 2 to cause the rod 2*a* to move backward, while discharging the working oil from the first cylinder chamber.

The hydraulic system of this embodiment comprises a plurality of position sensors (the arrangement associated with one position sensor is shown in FIG. 1) each of which is configured to contactlessly detect, based on the flow of working oil in the oil passage, information indicative of an actuator operating position and used for actuator control by means of the controller 6. Each position sensor is disposed in the oil passage between the solenoid valve 8 and the cylinder actuator 2. As for the position sensor, a detailed explanation will be given later.

In order to simplify the construction of the hydraulic system and ease the assembly and disassembly thereof, the hydraulic system of this embodiment is configured to combine a manifold block 7, a sensor block 9 and a solenoid valve block 5 associated with each cylinder actuator 2 into one piece with use of, e.g., four bolts 18, and corresponding ones of oil passage portions, which are formed in these three blocks 7, 9 and 5 and which constitute part of the oil passage, can be communicated with one another by simply combining these blocks into one piece, with the detecting section 13–16 of the position sensor attached in advance to the sensor block 7 and with the solenoid valve 8 attached to the solenoid valve block 5.

Figure 2:
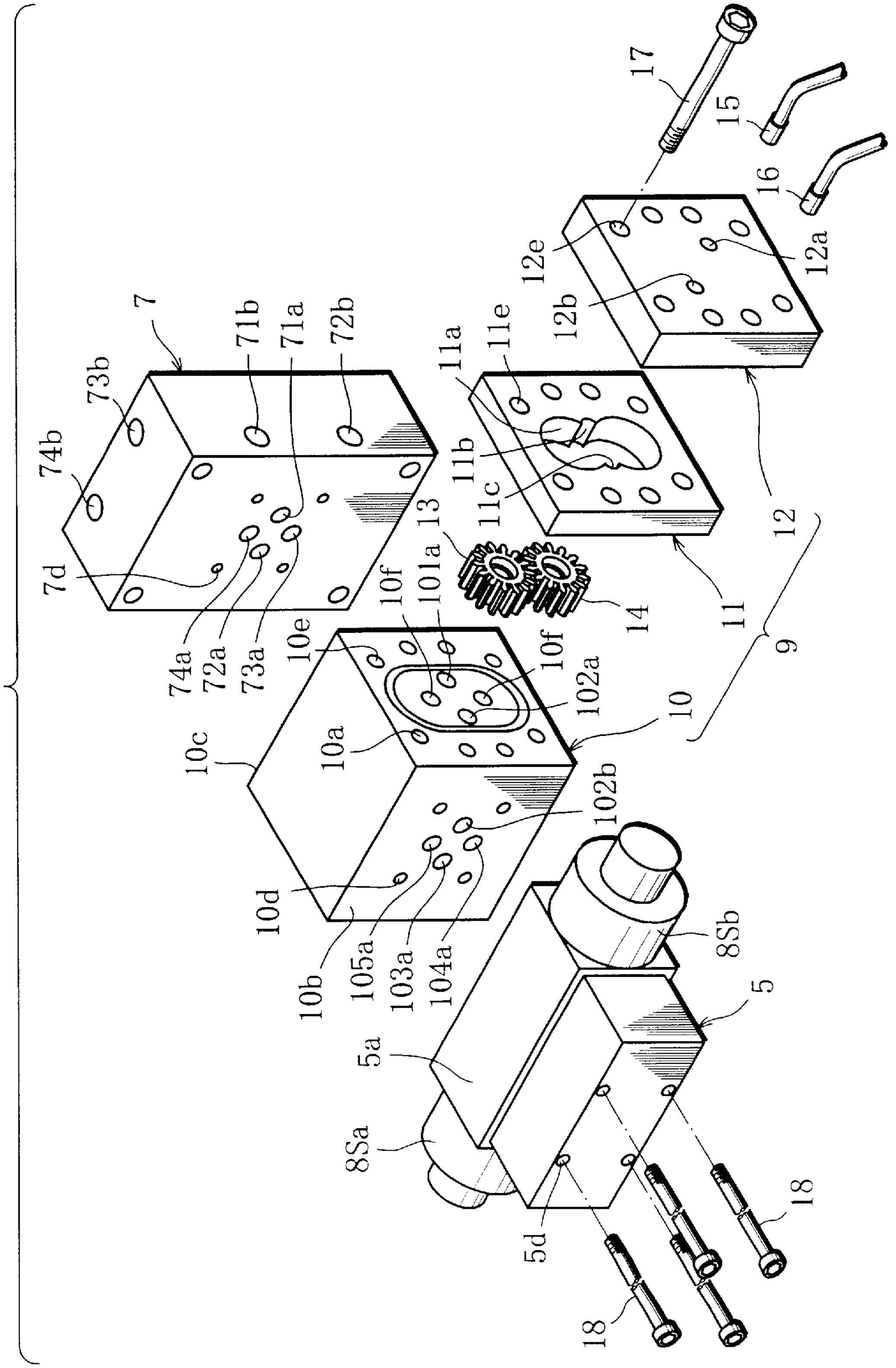
FIG. 2 is an exploded perspective view of the position sensor shown in FIG. 1.
Figure 3:
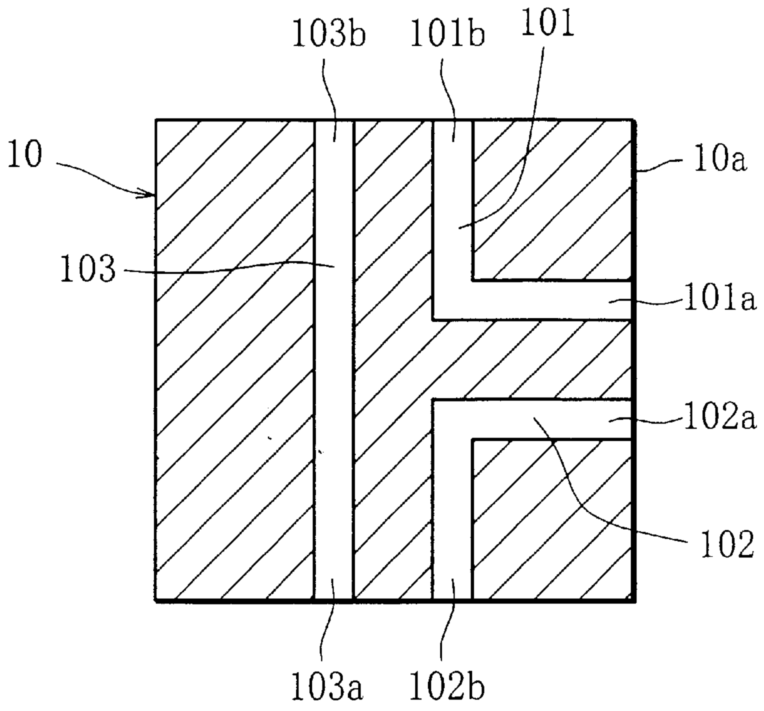
FIG. 3 is a section view showing part of a fluid passage formed in a sensor block of the position sensor shown in FIGS. 1 and 2.

In FIG. 2, reference numerals 5*d* and 10*d* denote bolt-insertion holes formed in the solenoid valve block 5 and a main body 10 of the sensor block 9 so as to permit the bolts 18 to be inserted therethrough, and reference numeral 7*d* denotes threaded holes formed in the manifold block 7 so as to permit the bolts 18 to be threadedly engaged therewith.

As shown in FIGS. 1 and 2, the sensor block 9 is comprised of the sensor block body 10, a first plate 11 attached to one end face (first outer face) 10*a* of the sensor block body 10, and a second plate 12 attached to an outer end face of the first plate 11. The first and second plates 11, 12 are connected to the sensor block body 10 integrally therewith by means of, e.g., six bolts 17. In FIG. 2, reference numerals 11*e* and 12*e* denote bolt-insertion holes formed in the first and second plates 11, 12 so as to permit the bolts 17 to be inserted therethrough, and reference numeral 10*e* denotes threaded holes formed in the sensor block body 10 so as to permit the bolts 17 to be threadedly engaged therewith.

The sensor block body 10 is formed with first through fifth oil passage portions 101–105. Respective one ends of the first and second oil passage portions 101 and 102 open to an end face 10*a* of the sensor block body. Another end 102*b* of the second oil passage portion and respective one ends 103*a*–105*a* of the third, fourth and fifth oil passage portions open to an outer face (second outer face) 10*b* of the sensor block body on the side close to the solenoid valve block. Another end 101*b* of the first oil passage portion and respective other ends 103*b*, 104*b* and 105*b* of the third, fourth and fifth oil passage portions open to an outer face (third outer face) 10*c* of the sensor block body on the side close to the manifold block, respectively.

Each solenoid block 5 is provided with a solenoid-valve mounting section 5*a* to which a solenoid valve 8 is attached. Each solenoid block 5 is formed with first through fourth oil passage portions 81–84. Respective one ends of the first through fourth oil passage portions 81–84 are aligned with another end 102*b* of the second oil passage portion and respective one ends 103*a*–105*a* of the third through fifth oil passage portions that are formed in the sensor block body 10. Respective other ends of the first through fourth oil passage portions 81–84 are connected to the second output port, the first output port, the first input port and the second input port of the solenoid valve 8, respectively.

Each manifold block 7 is formed with first through fourth oil passage portions 71–74. Respective one ends 71*a*–74*a* of the first through fourth oil passage portions are aligned with respective other ends 101*b*, 103*b*, 104*b* and 105*b* of the first, third, fourth and fifth oil passage portions formed in the sensor block body 10, respectively. Further, the first and second oil passage portions formed in the manifold block 7 have their other ends 71*b* and 72*b* opening to one end face of the manifold block 7 and are connected to the second and first ports 2B, 2A of the cylinder actuator 2 through hoses 23, 22 constituting part of the oil passage. Respective other ends 73*b*, 74*b* of the third and fourth oil passage portions formed in the manifold block 7 open to an upper face of the manifold block 7 and are connected to the oil tank 4 and the discharge side of the oil pump 3 through hoses 21, 20 constituting part of the oil passage, respectively.

Figure 4:
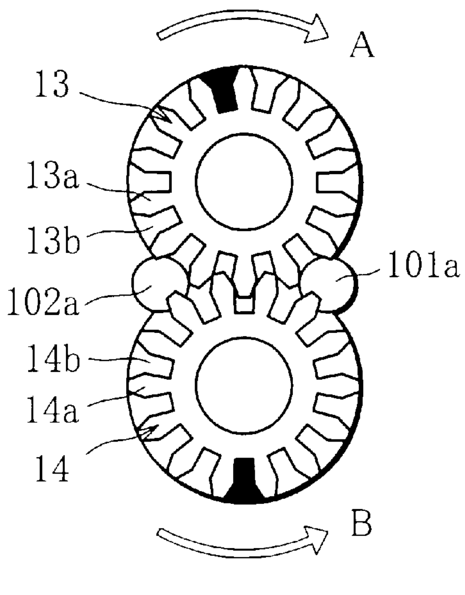
FIG. 4 is a view for explaining an action of rotation of gears of the position sensor.
Figure 5:
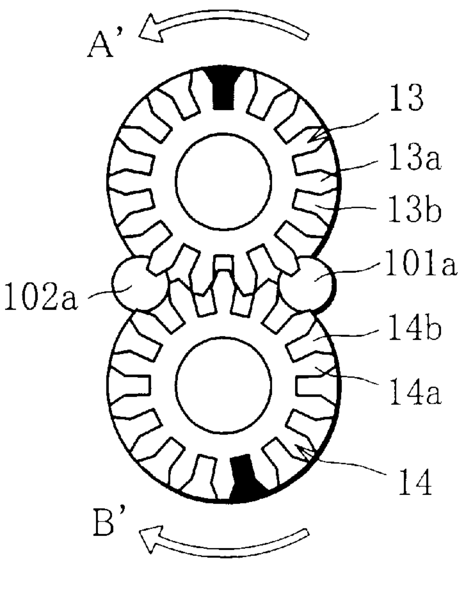
FIG. 5 is a view for explaining an action of opposite rotation of the gears.

In the following, the position sensors provided in a hydraulic system according to the present embodiment will be explained with reference to FIGS. 2, 4 and 5.

Each of the position sensors is provided with first and second gears 13, 14 made of a metal material capable of influencing a magnetic field. In relation to the gears 13, 14, the end face 10*a* of the sensor block body 10 is formed with two axial holes 10*f* that permit shafts, not shown, for supporting the gears 13, 14 to be inserted thereinto. Meanwhile, such shafts may be omitted to simply the construction. The first plate 11 is formed with a gear-accommodating space 11*a* for receiving the gears 13, 14. The gear-accommodating space 11*a*, which has first and second gear receiving sections each having a circular shape as viewed from end side, is formed as a whole into a cocoon shape. The gear-accommodating space 11*a* is formed at its vertically central portions with first and second passages 11*b* and 11*c* each having a semi-circular shape as viewed 5 from side end. The first and second passages 11*b*, 11*c* have their inner ends that are communicated with one ends 101*a*, 102*a* of the first and second oil passage portions formed in the sensor block body 10, respectively, and cooperate with the gear-accommodating space 11*a* to constitute an oil passage portion (shown by reference numeral 106 in FIG. 1) that is interposed between the first and second oil passage portions 101, 102 of the sensor block body 10.

The first and second gears 13, 14 of the position sensor are received in the gear-accommodating space 11*a* of the first plate 11 in a manner meshing with each other and being rotatable. When working oil flows in the oil passage as the working oil is supplied to or discharged from the cylinder actuator 2, the flow of the working fluid in the aforementioned oil passage portion 106 acts on that portion of the gears 13, 14 where they are in mesh with each other, thereby causing the gears to rotate.

Each position sensor comprises first and second sensing elements 15, 16 each constituted by a magnetic proximity sensing element. The sensing elements 15, 16 are attached to mounting holes 12*a*, 12*b* formed in the second plate 12, respectively, so as to face a peripheral portion of the first or second gear 13 or 14 on both sides of the meshing portion of the gears 13, 14. The first and second sensing elements 15, 16 are configured to generate first and second sensor outputs which are 90 degree out of phase with each other, each time the first and second gear 13, 14 rotate for a predetermined angle so that a tooth portion 13*a* or 14*a* of the gear 13 or 14 passes in front of the sensing element. Each position sensor further comprises a detecting section 6*a* accommodated in the controller 6. The detecting section 6*a* is configured to determine an operating position of the hydraulic actuator 2 based on the first and second sensor outputs supplied from the first and second sensing elements 15, 16.

In the following, the operation of the hydraulic system of this embodiment will be explained.

In association with a given cylinder actuator 2, it is assumed that the solenoid valve 8 is supplied at its second solenoid coil 8Sb with electric power and assumes the second changeover position 8SB, so that the rod 2*a* of the cylinder actuator 2 is in its most-backward position.

When the first solenoid coil 8Sa of the solenoid valve 8 is supplied with electric power from the controller 6 so that the solenoid valve 8 is changed over from the second position 8SB to the first position 8SA, working oil is supplied from the oil pump 3 to the second input port of the solenoid valve 8 through the hose 20 and the oil passage portions 74, 105 and 84. Then, the working oil is supplied from the second input port to the first cylinder chamber of the cylinder actuator 2 through the second output port, the oil passage portions 82, 103 and 72, the hose 22 and the first port 2A of the cylinder actuator 2, whereby the rod 2*a* is caused to advance.

With this advancing movement of the rod 2*a*, the working oil in the second cylinder chamber of the cylinder actuator 2 is discharged to the oil tank 4 through the hose 23, the oil passage portions 71, 101, 106, 102 and 81, the solenoid valve 8, the oil passage portions 83, 104 and 73 and the hose 21. As for the position sensor, the working oil enters from one end 101*a* of the oil passage portion 101 into the oil passage portion 106, an then enters into a gap 13*b* between adjacent teeth portions of the first gear 13 and into a gap 14*b* between adjacent teeth portions 14*a* of the second gear 14, thereby causing the first gear 13 to rotate anti-clockwise as shown by arrow A' in FIG. 5 and causing the second gear 14 to rotate clockwise as shown by arrow B'. Then, the working oil flows from the oil passage portion 106 to one end 102*a* of the oil passage portion 102.

As the first and second gears 13, 14 rotate in this manner, the first and second sensing elements 15, 16 of the position sensor generate the first and second sensor outputs that are out of phase with each other, each time a tooth portion 13*a* or 14*a* of the gear 13 or 14 passes in front of the sensing element associated therewith. The detecting section 6*a* of the controller 6 determines the direction of rotation of the gear 13 or 14 based on a phase relation between the first and second sensor outputs, and, based on the direction of gear rotation, determines that the rod 2*a* of the cylinder actuator 2 is moving forwardly. The detecting section 6*a* counts up the number of times of generating the first or second sensor output, and, based on counted number of times, determines an amount of advancement of the rod 2*a* from its most-backward position and by extension a moving position of the rod 2*a* (more generally, the operating position of a hydraulic actuator).

When the rod 2*a* of the cylinder actuator 2 advances up to its most-forward position, the piston 2*b*, for instance, is in abutment with a stopper, not shown, in a condition that the working oil is kept supplied to the first cylinder chamber of the cylinder actuator 2. Further, the total number of times of generating the sensor output of the first or second sensing element 15 or 16, which is counted up from the start of advancement of the rod 2*a* from its most-backward position, reaches a predetermined value indicative of arrival to the most-forward position, so that the detecting section 6*a* detects that the rod 2*a* reaches its most-forward position.

Subsequently, when the solenoid valve 8 is changed over from the second position 8SB to the first position 8SA, the working oil is supplied from the oil pump 3 through the oil passage to the second cylinder chamber of the cylinder actuator 2, so that the rod 2*a* retreats from its most-forward position to its most-backward position while discharging the working oil from the first cylinder chamber to the oil tank 4 through the oil passage. At this time, in relation to the position sensor, the working oil enters from one end 102*a* of the oil passage portion 102 into the oil passage portion 106, thereby causing the first and second gears 13, 14 to rotate clockwise and anti-clockwise, respectively, as shown by arrows A and B in FIG. 4. Then, the working oil flows from the oil passage portion 106 to one end 101*a* of the oil passage portion 101. During the rotation of the gears, the first and second sensor outputs are supplied from the first and second sensing elements 15, 16 to the detecting section 6*a*. Since the phase relation between the first and second sensor outputs is opposite to the case where the rod moves forwardly, the detecting section 6*a* determines that the rod 2*a* retreats, and detects an amount of the backward movement of the rod 2*a* from its most-forward position and by extension the current moving position of the rod (more generally, the current operating position of a hydraulic actuator) based on the number of times for which the first or second sensor output is generated.

When the rod 2*a* retreats up to the most-backward position, the piston 2*b* is brought in abutment with a stopper, not shown, and is maintained there, in a condition that the working oil is kept supplied to the second cylinder chamber of the cylinder actuator 2, and the detecting section 6*a* detects that the rod 2*a* reaches its most-backward position.

In this hydraulic system, under the control of the controller 6, working fluid is also supplied to and discharged from other cylinder actuators, so as to cause the rod of each cylinder actuator to move forward or backward.

As explained above, the hydraulic system of this embodiment is provided with a plurality of cylinder actuators 2 each having the manifold block 7, the sensor block 9 and the solenoid valve block 5 that are combined into one piece, and thus includes plural sets of blocks 7, 9 and 5 respectively corresponding to the plurality of cylinder actuators 2. The plural sets of blocks may be formed separately from or integrally with one another.

Figure 6:
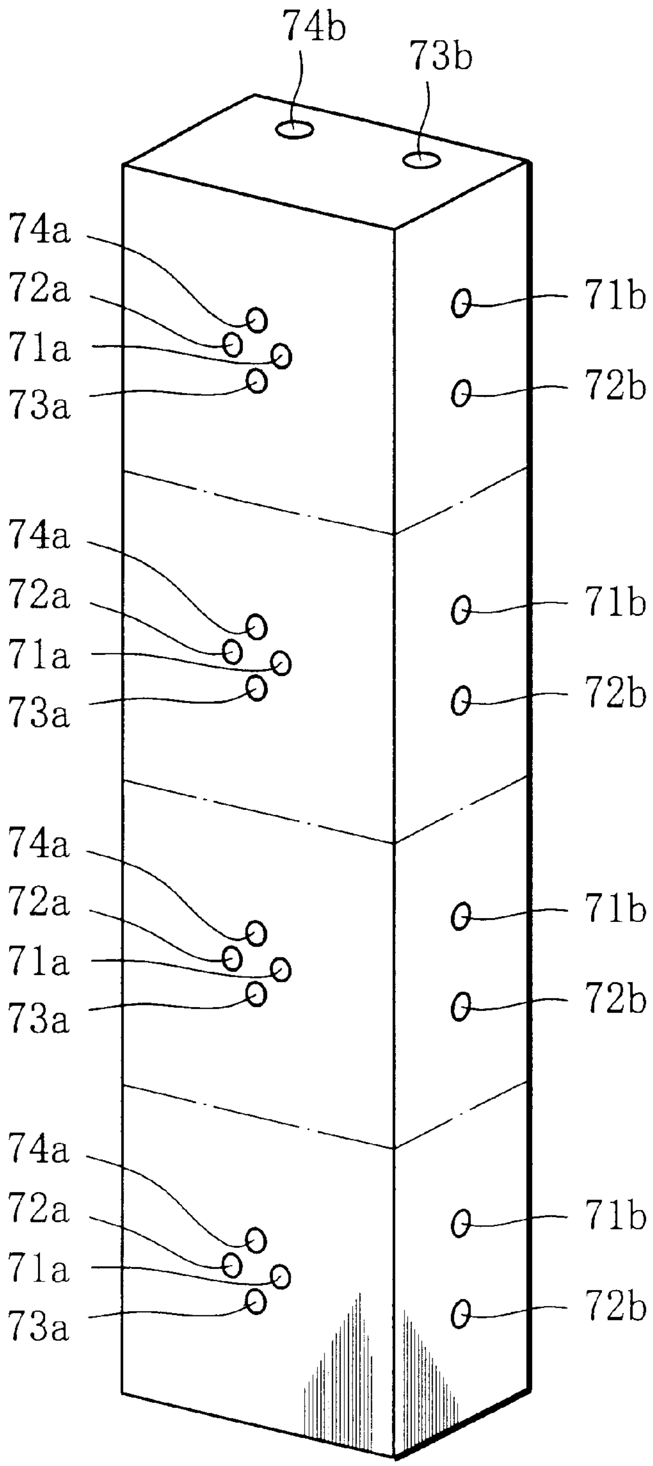
FIG. 6 is a perspective view showing four manifold blocks that are formed integrally with one another.

In a case where plural sets of blocks 7, 9 and 5 are formed integrally with one another, the hydraulic system may include a plurality of, e.g., four manifold blocks 7 that are formed integrally with one another so as to constitute an elongated block, as shown by way of example in FIG. 6. Each manifold block 7 is formed with first and second oil passage portions 71, 72 as in the case of the manifold block 7 shown in FIGS. 1 and 2. In addition, it is formed with an upstream side of a third oil passage portion 73 and a downstream side of a fourth oil passage portion 74. In FIG. 6, reference numerals 71*a* and 72*a* denote respective one ends of the first and second oil passage portions, and 71*b* and 72*b* denote respective other ends of these oil passage portions which are connected to the second and first ports 2B, 2A of the cylinder actuator 2 through hoses 23, 22, respectively. Further, the elongated manifold block comprised of the four blocks is formed with those two holes so as to vertically extend therethrough, which individually constitute a downstream side of the third oil passage portion and an upstream side of the fourth oil passage portion and which are common to the four manifold blocks 7. These two holes are in communication with the third and fourth oil passage portions of each manifold block, respectively, and have their upper ends 73*b*, 74*b* individually opening to an upper face of the elongated block and have their lower ends that are closed. The upper ends 73*b*, 74*b* are connected to the oil tank 4 and the oil pump 3 through hoses 21, 20, respectively. Each block 7 constituting the elongated manifold block is mounted with a sensor block 9 and a solenoid valve block 5. With this arrangement, sensing sections of four position sensors can be formed into one piece, so that wires connecting the sensing elements 15, 16 of the position sensors and the controller 6 can be collectively provided and can be shortened in length, even if four cylinder actuators 2 are disposed at different locations that are apart from one another. As a consequence, the construction of the hydraulic system can be simplified, the appearance thereof can be improved, and disconnection failures can be reduced.

The present invention is not limited to the foregoing embodiment, and may be modified variously.

For example, in the embodiment, a case has been explained where a position sensor of this invention is applied to a cylinder actuator configured to cause a rod to linearly move between its most-backward position and its most-forward position. However, a position sensor of this invention is applicable to a hydraulic actuator such as a hydraulic rotary actuator, i.e., a hydraulic motor, other than the cylinder actuator, so as to detect the operating position of such an actuator. Further, a hydraulic system to which the present invention is applied is not required to have a plurality of hydraulic actuators. The present invention is applicable to a hydraulic system provided with a single hydraulic actuator.

In the embodiment, a case has been explained in which working fluid is supplied and discharged through a two-position solenoid valve. However, the present invention is applicable to a hydraulic system using a three-position solenoid valve having a neutral position in addition to first and second changeover positions. With such an arrangement, a cylinder actuator rod (more generally, a movable member of an actuator) can be stopped at its arbitrary moving position by changing the solenoid valve over to the neutral position, and accordingly, the controller 6 is permitted to detect the direction of rod movement and the moving distance of the rod from its most-backward position or its most-forward position based on sensor outputs from sensing elements of the position sensor and to cause the rod to stop at a predetermined operating position by changing the solenoid valve over to the neutral position when such an operating position is reached.

In the hydraulic system according to the embodiment, the construction of the manifold block 7, the sensor block 7 and the solenoid valve block 5 may be modified variously. For example, a pilot check valve, a throttle valve and the like may be interposed between oil passage portions formed in, e.g., the sensor block 9 and the manifold block 7.

In other respects, the present invention may be modified within the scope of this invention.

What is claimed is:

1. A position sensor, comprising:

at least one gear disposed in a fluid passage of a hydraulic actuator so as to be rotatable by a flow of working fluid in the fluid passage;

a first sensing element, disposed to face said gear, for generating a first sensor output each time the gear rotates for a predetermined angle;

a second sensing element, disposed to face said gear, for generating a second sensor output which is out of phase with the first sensor output each time said gear rotates for the predetermined angle; and a detecting section for determining an operating position of said hydraulic actuator based on the first and second sensor outputs supplied from said first and second sensing elements.

2. The position sensor according to claim 1, wherein each of said first and second sensing elements is comprised of a magnetic proximity sensing element disposed to face a peripheral portion of said at least one gear, and said gear is made of a metal material capable of influencing a magnetic field.

3. The position sensor according to claim 1, wherein said position sensor comprises first and second gears that are disposed in the fluid passage so as to be in mesh with each other and to be rotatable by a flow of the working fluid.

4. The position sensor according to claim 3, wherein said first and second gears are disposed in the fluid passage so as to receive the flow of the working fluid at their portions where they are in mesh with each other.

5. The position sensor according to claim 1, further comprising:

a sensor block that includes a sensor block body formed with first and second fluid passage portions constituting part of the fluid passage and having a first outer face to which respective one ends of the first and second fluid passage portions open, and a first plate attached to the first outer face of the sensor block body, wherein said first plate is formed with a gear-accommodating space for receiving said at least one gear so as to be rotatable, said gear-accommodating space being communicated with the respective one ends of the first and second fluid passage portions.

6. The position sensor according to claim 5, wherein said gear-accommodating space is formed so as to receive first and second gears to be in mesh with each other and to be rotatable by the flow of the working fluid.

7. The position sensor according to claim 6, wherein said gear-accommodating space is formed so as to be communicated with respective one ends of the first and second fluid passage portions in vicinity of portions of the first and second gears where they are in mesh with each other.

8. The position sensor according to claim 5, further comprising:

a second plate attached to an outer face of said first plate on a side remote from the sensor block, wherein said second plate is formed with an element-attaching section to which the first and second sensing elements are attached so as to face said gear.

9. A hydraulic system, comprising:

a working fluid source for supplying working fluid;

one or more hydraulic actuators that are operable in response to supply of the working fluid;

one or more fluid passages extending between said working fluid source and said one or more hydraulic actuators;

one or more valves disposed in said one or more fluid passages for allowing or prohibiting supply of the working fluid from said working fluid source to said one or more hydraulic actuators through said one or more hydraulic passages;

a controller for drivingly controlling said one or more valves; and one or more position sensors disposed in said one or more fluid passages, each of said one or more position sensors being configured as set forth in claim 1.

10. The hydraulic system according to claim 9, wherein each of said one or more position sensors is disposed in the fluid passage between the valve and the hydraulic actuator, which individually correspond to the position sensor.

11. The hydraulic system according to claim 9, wherein each of said one or more valves is comprised of an electromagnetic changeover valve.

12. The hydraulic system according to claim 11, wherein said each electromagnetic changeover valve has first and second input ports and first and second output ports, said first and second input ports are connected to said working fluid source and a reservoir section for storing the working fluid, said first and second output ports are individually connected to first and second ports of a hydraulic actuator corresponding to the electromagnetic changeover valve, and said electromagnetic changeover valve assumes, under control of said controller, a first changeover position where the first and second input ports are individually communicated with the first and second output ports and a second changeover position where the first input port is communicated with the second output port and the second input port is communicated with the first output port.

13. The hydraulic system according to claim 9, wherein the hydraulic system has one or more position sensors each of which further comprises a sensor block that includes a sensor block body formed with first and second fluid passage portions constituting part of the fluid passage and having a first outer face to which respective one ends of the first and second fluid passage portions open and a second outer face to which another end of the second fluid passage portion opens, and a first plate attached to the first outer face of the sensor block body, said first plate being formed with a gear-accommodating space for receiving said at least one gear so that the at least one gear is rotatable, said gear-accommodating space being communicated with the respective one ends of the first and second fluid passage portions, said hydraulic system further comprises one or more valve blocks each attached to the second outer face of the sensor block body of a corresponding one of said one or more position sensors, each valve block has a valve-attaching portion thereof to which a corresponding one valve is attached, and said valve block is formed with a first fluid passage portion in alignment with another end of the second fluid passage portion formed in the sensor block body associated therewith.

14. The hydraulic system according to claim 13, wherein said each sensor block body has a third outer face to which another end of the first fluid passage portion formed therein opens, said each sensor block body is further formed with third, fourth and fifth fluid passage portions having their opposite ends that open to the second and third outer faces of the sensor block body, respectively, and said each valve block is formed with second, third and fourth fluid passage portions in alignment with respective one ends of the third, fourth and fifth fluid passage portions formed in the sensor block body associated therewith.

15. The hydraulic system according to claim 14, further comprising:

one or more manifold blocks each attached to the third outer face of the sensor block body of a corresponding one of said one or more position sensors, wherein each manifold block is formed with first through fourth fluid passage portions in alignment with respective other ends of the first, third, fourth and fifth fluid passage portions formed in the sensor block body associated therewith.

* * * * *